United States Patent [19]

Hedlund et al.

[11] 4,358,798
[45] Nov. 9, 1982

[54] SPECIAL EFFECTS SYSTEM

[75] Inventors: Lee V. Hedlund, Maple Shade; Richard E. Mathys, Sr., Clementon, both of N.J.

[73] Assignee: RCA Corporation, New York, N.Y.

[21] Appl. No.: 213,219

[22] Filed: Dec. 5, 1980

[30] Foreign Application Priority Data

Apr. 10, 1980 [GB] United Kingdom ................ 8011864

[51] Int. Cl.³ .............................................. G11B 15/46
[52] U.S. Cl. ........................................ 360/73; 318/490
[58] Field of Search ....................... 360/73, 74, 10, 37; 318/314, 318, 490; 364/565, 426

[56] References Cited

U.S. PATENT DOCUMENTS

| | | | |
|---|---|---|---|
| 3,639,754 | 2/1972 | Kovalcik et al. | 364/426 |
| 4,261,020 | 4/1981 | Beeson et al. | 360/73 |
| 4,267,564 | 5/1981 | Flores | 360/73 X |
| 4,296,446 | 10/1981 | Zorbalas | 360/73 |

Primary Examiner—John H. Wolff
Attorney, Agent, or Firm—E. M. Whitacre; W. H. Meise; H. I. Steckler

[57] ABSTRACT

A speed control signal for a record segment is generated from starting speed and starting time information signals, an ending speed information signal, and a signal indicative of the duration of the segment. Provision is made for "pre-roll" (stopping the tape ahead of the exact cue point). Duration can be entered directly or computed from start and end times. The speed control signal is applied to a capstan servo, while a cue logic servo controls a reel servo.

9 Claims, 3 Drawing Figures

Fig. I.

SPECIAL EFFECTS SYSTEM

BACKGROUND OF THE INVENTION

The present invention relates to a television special effects system, and more particularly, to one that provides variable speed for a video tape recorder (VTR) during the playback mode.

Up until now, it has been conventional to achieve variable playback speeds of a record segment using a variable DC voltage in an open loop system; however this is not an accurate way of achieving variable playback speeds. U.S. patent application Ser. No. 94,690, filed Nov. 15, 1979, shows a motor speed control circuit that is capable of highly accurate and reproducable motor speeds in response to a speed command signal. However, it does not show in detail a means for obtaining the motor speed control signal.

It is therefore desirable to have a motor speed control signal for controlling a motor speed control circuit. It is also desirable to control the rate of change of a speed-change special effect from an initial speed to a final speed.

SUMMARY OF THE INVENTION

Method and apparatus for generating speed control signals for a record segment from starting speed and starting time information signals, an ending speed information signal, and a signal indicative of the duration of said segment, said method comprising computing a change in velocity signal for said segment from starting and ending speed information signals, computing said speed control signal from said start speed, change in velocity, and said duration indicative signals, and applying said speed control signal to a capstan servo.

DETAILED DESCRPITON

Figure 1:
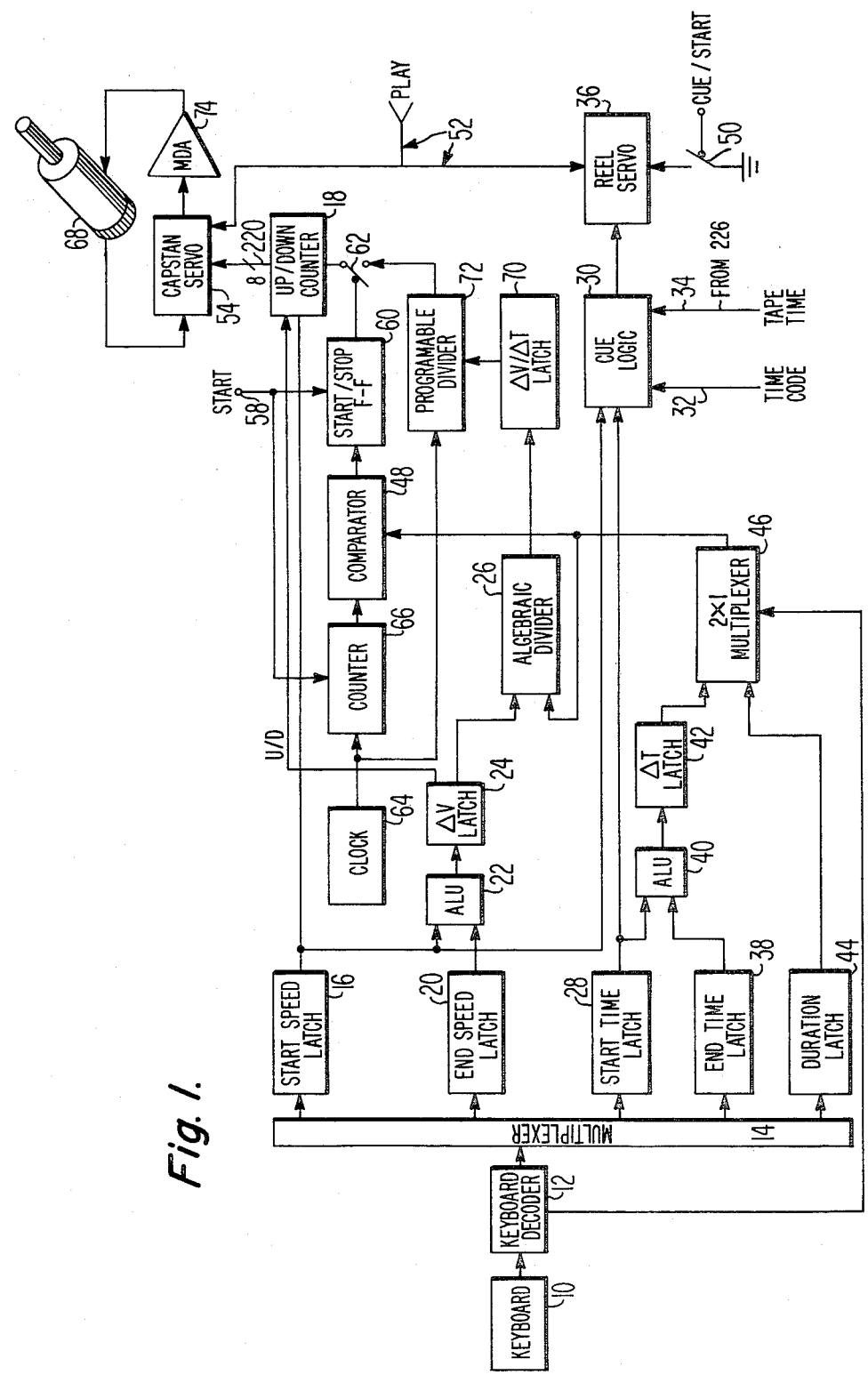
FIG. 1 is a block diagram of an embodiment of the invention.

The first thing that is done is to enter a particular start speed on keyboard 10, together with a start speed code indicating that what is entered is in fact the start speed. This start speed is the speed at which the start of a particular tape segment that is controlled by motor 68 is to be dubbed into an edited master tape (not shown), or directly broadcast. The start speed is decoded by keyboard decoder 12 and applied by multiplexer 14, using the start speed code, to speed start latch 16. From there, the start speed is applied to the up/down counter 18 and cue logic circuit 30. The next operation is to enter using keyboard 10 the desired end speed of the particular segment, which can be either faster, slower, or the same as the start speed. This is decoded by keyboard decoder 12 and applied by multiplexer 14 to end speed latch 20. The difference between the start and end speeds is computed by arithmetic logic unit or subtractor 22 and the difference is stored in a ΔV latch 24. This difference is applied from latch 24 to an input of an algebraic divider 26 and to counter 18. Next the tape start time is entered on keyboard 10. This time can be either the SMPTE time code which is on the tape or a time related to readings from a tachometer continuously engaged with the tape (not shown). The start time is entered and applied by multiplexer 14 to start time latch 28 and from there is applied to cue logic circuit 30. In cue logic circuit 30, which comprises a digital comparator as described in more detail below, the start time is compared with either the time code from the tape which is applied at input 32 or the tape time at input 34, in either case related to the tape segment. From logic 30 a signal is applied to reel servo circuit 36 which in turn controls the speed and location of the tape during the cueing operation. Thereafter, either the duration of the segment to be inserted or the tape end time of said segment is entered by using keyboard 10 and is decoded by decoder 12. If the end time has been entered, it is applied by multiplexer 14 to end time latch 38. Arithmetic logic unit or subtractor 40 forms the difference between the start time and the end time and applies this difference, which is the selected duration of the segment, to the ΔT latch 42. If the duration itself was entered, then multiplexer 14 applies the information to duration latch 44. A two-by-one multiplexer 46 is controlled by decoder 12 and selects whichever duration is present, i.e. that at ΔT latch 42 or at duration latch 44, and applies it to a comparator 48 and to divider 26. Divider 26 divides the change in velocity by the duration or change in time, which results in acceleration information, which is stored in latch 70. The output of latch 70 is applied to programmable divider 72.

The next step is to manually or automatically close cue start switch 50. This starts the reel servo circuit 36 to move the tape. Cue logic circuit 30 then reads either the time code at input 32 or the tape time at input 34 and compares it to the start time stored in latch 28. After said comparison, cue logic 30 activates reel servo 36 to move the tape nad then stop it at a point slightly ahead of the exact cue point. This is known as "pre-roll" and allows time for the tape to achieve the proper start speed after a play command is received. Basically, the slower the start speed the closer the pre-roll point should be to the exact cue point. Thereafter, the play command line 52 is activated, which starts the reel servo 36 and the capstan servo circuit 54 to begin the effect. Circuit 54 controls motor drive amplifier 74 and hence motor 68, so that the desired start speed effect will be achieved at or before the time that the cue point is reached. A start effect signal will occur at input terminal 58 from digital comparators (not shown) which is due to a comparison of the cue point with either tape time or a time code with the start time. Alternatively, a manual start effect signal can be applied to terminal 58. This sets flip flop 60, which in turn closes switch 62 Also, counter 66 is reset to zero by the start effect signal. The up/down counter 18 will then count either up or down in accordance with whether the acceleration signal from latch 70 is either positive or negative. Clock 64 and counter 66 apply pulses to comparator 48 from the time counter 66 was reset to zero. When the duration signal from multiplexer 46 equals the count in the counter 66, comparator 48 resets the start/stop flip flop 60, which opens switch 62 and this stops the speed change. The end velocity of the tape will equal the velocity at the end of the segment. Thus, ordinarily the tape will keep going unless the final velocity happens to be zero.

The playback speed can be incremented in increments as small as one field throughout the range from the highest reverse speed through the highest forward speed.

Figure 2:
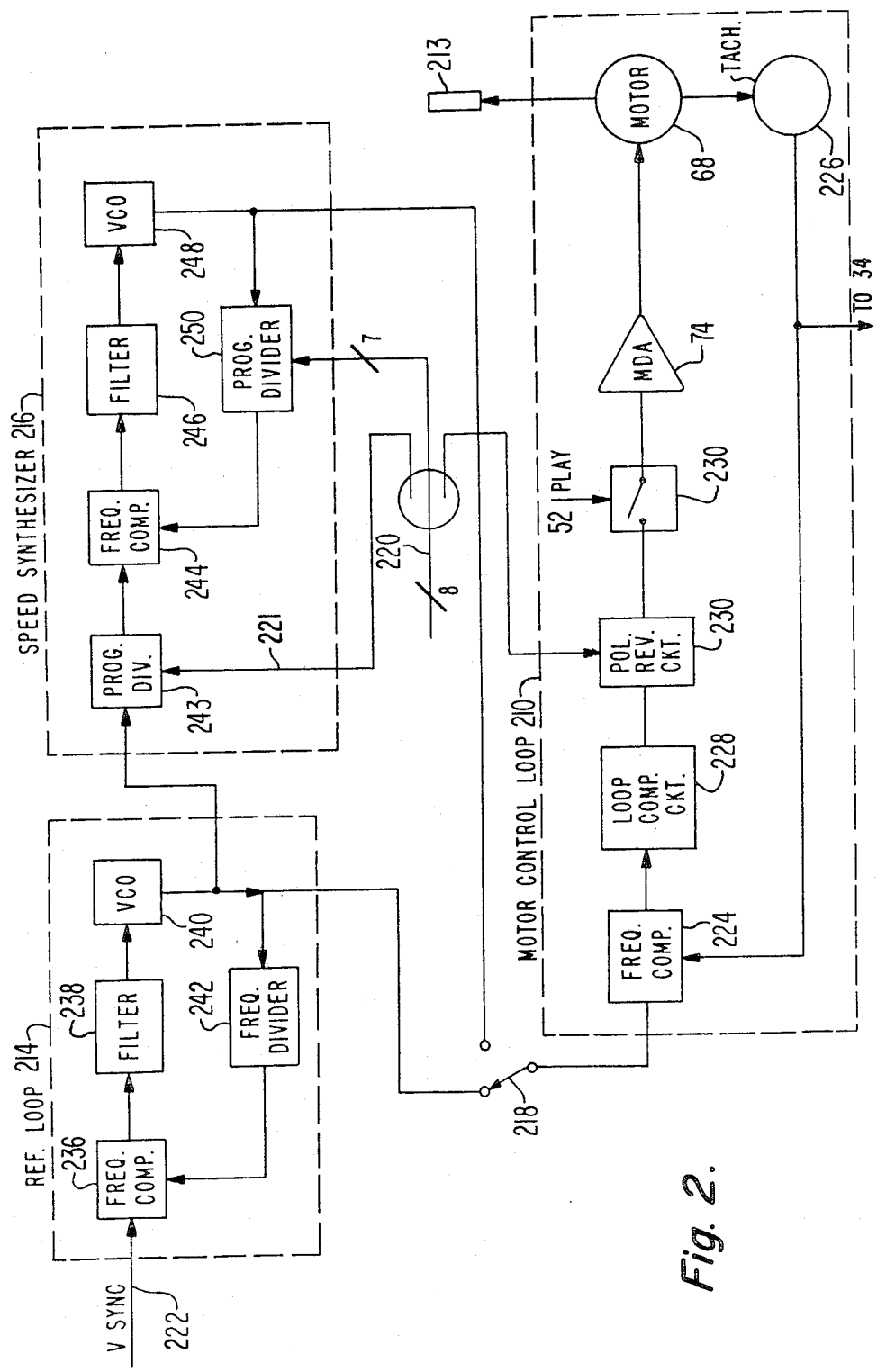
FIG. 2 is a block diagram of a capstan servo used in the invention of FIG. 1.

In general, the capstan servo 54 of said prior application is shown in FIG. 2 and comprises a motor control loop and drive circuit 210 used for controlling the speed of motor 68, which in turn has a capstan 213 coupled to it. A speed control signal is applied to motor drive circuit 210 from either a reference loop 214, if it is desired to use normal playback speed, or a speed synthesizer 216, if it is desired to operate at other than a normal playback speed. The selection between the two is done by switch 218. The speed synthesizer 216 receives speed command signals from counter 18 on 8-bit bus 220, while the reference loop 214 receives vertical synchronization pulses from a line 222 so as to be able to supply a reference signal that is in synchronization with the vertical synchronization pulses.

The capstan servo 54 will now be described in more detail. The motor drive circuit 210 comprises frequency comparator 224, which comprises a phase comparator for providing an output signal if the frequency or phase of input signals differ. Comparator 224 receives a speed control signal from switch 218 at one input and a signal from tachometer 226 representative of the speed of motor 68 at another input. An output signal from comparator 224 is applied to a loop compensation circuit 228. This circuit is a lead-lag filter, which is necessary to stabilize the motor drive circuit which comprises a control loop. The output signal from circuit 228 is then applied to a polarity reversing circuit 230 which has a control input from bus 220 that will reverse the current appearing at its output, thus controlling the direction of rotation of motor 68. Reversing circuit 230 can comprise relays or a solid state switch. The output from circuit 230 is applied to a switch 232 which receives at its input PLAY command from line 52. The output of switch 232 is applied to a motor drive amplifier (MDA) 74. This amplifier does not supply any current at its output when the switch 232 is open, and thus when switch 232 is open, there will be no actuation of the motor 68. Further, amplifier 74 is of the Class AB type with current feedback to provide a constant current drive to motor 68.

Reference loop 214 comprises a frequency and phase comparator 236 which receives at a first input a vertical synchronization signal. The output of comparator 236 is applied to a filter 238 for proper compensation of the reference loop 214. The output of the filter 238 is applied to a voltage controlled oscillator (VCO) 240, which in turn applies its output to a frequency divider 242. Divider 242 provides a frequency divided output signal to a second input of the frequency comparator 236. When switch 218 is in its left hand position, the output signal from VCO 240 is also applied to frequency comparator 224. In a particular embodiment, the tachometer 226 provides an approximately 6kHz output signal when the motor is running at normal speed. Since the input at frequency comparator 224 coming from VCO 240 must have the same frequency as that applied from tachometer 226, a division ratio of 102 is chosen for a divider 242 for an NTSC system. This will cause the VCO frequency to be approximatley 6kHz, which is 102 times the vertical sync frequency of 59.94 Hz being applied on input line 222 to reference loop 214. For a PAL-B system, which uses a 50 Hz vertical sync frequency, the division factor of frequency divider 242 must be 120. The output of VCO 240 is also applied to speed synthesizer 216, in particular to a programmable divider 243, whose operation is controlled by line 221, which decodes the highest two significant bits of bus 220. For NTSC, divider 243 divides the frequency of the signal from VCO 240 by 60 for proper scaling. Above a certain speed, line 221 causes the division ratio to be altered from 60 to 30 for ease of implementation of synthesizer 216. For PAL-B system, the numbers would be 50 and 25 respectively. The output of divider 243 is applied to a frequency comparator 244. The output of the comparator 244 is applied to a smoothing and loop compensation filter 246 and from there to a voltage controlled oscillator 248. The voltage controlled oscillator 248 output signal is applied to a programmable divider 250, as well as to the right side contact of switch 218. The programmable divider 250 has applied to it a seven-bit speed control command signal present on bus 220 and applies frequency divided output signals to the frequency comparator 244. It will be seen that the actual frequency of VCO 248 will depend upon the division factor of divider 250, which in turn is dependent upon the speed command control signal applied to it on bus 220.

In operation, if it is desired to record or to playback at a normal speed, the switch 218 is thrown to its left hand position as shown in the drawing. Thus the signal from VCO 240 will be applied to the motor control loop 210 and there compared with the output signal from tachometer 226 by frequency comparator 224. If the motor 68 is rotating at the conventional speed, comparator 224 will provide a selected DC voltage so that there will be a current supplied to motor 68 by amplifier 74 of a proper amount to maintain that speed. If the motor deviates from the normal speed, the frequency of the signal from tachometer 226 will deviate from 6kHz, thus causing a different DC output signal from comparator 224 from what was being provided before, and hence, a different current from motor drive amplifier 74 to cause the speed of motor 68 to either speed up or slow down until it returns to the normal speed. The direction of rotation can be controlled by the direction of command signal applied to polarity reversing circuit 230. If it is desired to playback at other than the normal standard speed, which is the case for the preferred embodiment of this invention, then switch 218 is thrown to its right hand position as shown in FIG. 2 and the speed will be controlled by the frequency of the signal provided by VCO 248. This in turn is dependent upon the division factor in divider 250, and in turn upon the digital speed control signals on bus 220 applied to divider 250.

Figure 3:
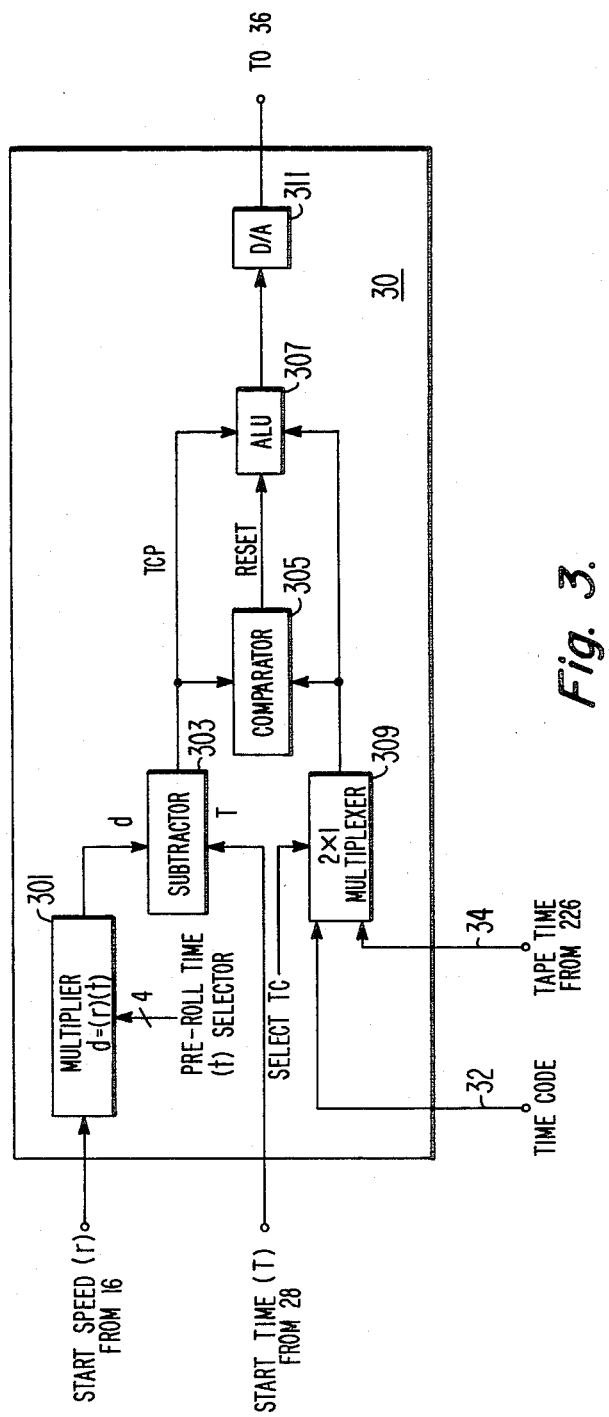
FIG. 3 is a block diagram of a cue logic circuit used in the invention of FIG. 1.

FIG. 3 shows the details of cue logic circuit 30. The cue point "$T_{cp}$" equals the start point "T" minus the park advance "d". To compute the park advance, which is equal to the start speed multiplied by a pre-roll time "t", a pre-roll time selection signal is applied to multiplier 301. This time signal is obtained from a switch on a control panel or a module of the VTR. The start speed signal in latch 16 is also applied to multiplier 301. The resulting output product signal from multiplier 301 represents the park advance and is applied to one input of a subtractor 303. The start time T from latch 28 is applied to the remaining input of subtractor 303. The resulting output difference signal, which represents the cue point, is applied to first inputs of comparator 305 and ALU 307. Time code, which is derived from the tape, is received at input 32, while tape time, which is derived from a tape engaged tachometer (not shown) is received at input 34. A selection time code control signal, which is selected by the operator, is applied to multiplexer 309 and determines which of the two time signals is applied to other inputs of comparator 305 and ALU 307. Comparator 305 supplies a $\overline{\text{RESET}}$ signal to maintain ALU 307 enabled as long as the tape time signal is not equal to the cue point signal from subtractor 303, e.g. the tape is not at the cue point. ALU 307 is a subtractor that provides an output signal that is the difference between the cue point and time code signals. This signal is converted to an analog signal by digital-to-analog converter 311. The analog signal is applied to reel servo 36 which in turn controls the speed and location of the tape during the cueing operation.

Thus as long as the cue point signal differs from the selected time signal, an analog signal is applied to reel servo 36. As the tape approaches the cue point, the difference signal from ALU 307 becomes smaller and therefore the motor 68 slows down, which prevents overshoot. When the tape reaches the cue point, a RESET signal is provided to ALU 307 by comparator 305, which disables ALU 307. The difference output signal from ALU 307 is zero, hence motor 68 stops. The tape is now cued with the proper amount of pre-roll and the special effect may be initiated as previously described.

What is claimed is:

1. A method for generating speed control signals for a record segment from starting speed and starting time information signals, an ending speed information signal, and a signal indicative of the duration of said segment, said method comprising computing a change in velocity signal for said segment from said starting and ending speed information signals, and computing said speed control signal from said start speed, change in velocity, and said duration indicative signals, and applying said speed control signal to a capstan servo.

2. A method as claimed in claim 1, wherein said second recited computing step comprises dividing said change in velocity signal by said duration indicative signal to obtain an acceleration signal and counting from said start speed in accordance with said acceleration signal.

3. A method as claimed in claim 1, wherein said duration indicative signal comprises an express duration signal.

4. A method as claimed in claim 1, wherein said duration indicative signal comprises a segment ending time information signal, and further comprising computing segment duration by subtracting said starting and ending time signals.

5. An apparatus for generating speed control signals for a record segment from starting speed and starting time information signals, an ending speed information signal, and a signal indicative of the duration of said segment, said apparatus comprising means for computing a change in velocity signal for said segment from said starting and ending speed information signals, means for computing said speed control signal from said start speed, change in velocity, and said duration indicative signals, a capstan servo, and means for applying said speed control signal to said capstan servo.

6. An apparatus as claimed in claim 5, wherein said second recited computing means comprises means for dividing said change in velocity signal by said duration indicative signal to obtain an acceleration signal and a counter that starts counting from said start speed in accordance with said acceleration signal.

7. An apparatus as claimed in claim 5 wherein said duration indicative signal comprises an express duration signal.

8. An apparatus as claimed in claim 5 wherein said duration indicative signal comprises a segment ending time information signal, and further comprising means for computing segment duration including a means subtracting said starting time signal from said ending time signals.

9. An apparatus as claimed in claim 5, wherein said second recited computing means comprises a clock, a first counter coupled to said clock, a comparator coupled to said first counter and receiving said duration indicative signal, a start flip-flop coupled to said comparator, a progammable divider coupled to said clock and receiving a signal that is a function of said change in velocity and duration signals for controlling the division ratio thereof, and up-down second counter receiving said start speed signal, and a switch coupled between said second counter and said divider, and to said flip-flop for control thereof.

* * * * *